US011901647B2

(12) United States Patent
Hiraoka et al.

(10) Patent No.: US 11,901,647 B2
(45) Date of Patent: Feb. 13, 2024

(54) ANTENNA DEVICE

(71) Applicant: Sony Group Corporation, Tokyo (JP)

(72) Inventors: Yoshiaki Hiraoka, Tokyo (JP); Yuichiro Suzuki, Tokyo (JP); Takayoshi Ito, Tokyo (JP); Tomihiro Omuro, Tokyo (JP); Toru Ozone, Tokyo (JP); Jin Sato, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 369 days.

(21) Appl. No.: 17/298,949

(22) PCT Filed: Dec. 13, 2018

(86) PCT No.: PCT/JP2018/045876

§ 371 (c)(1),
(2) Date: Jun. 2, 2021

(87) PCT Pub. No.: WO2020/121481

PCT Pub. Date: Jun. 18, 2020

(65) Prior Publication Data

US 2022/0069467 A1 Mar. 3, 2022

(51) Int. Cl.
*H01Q 5/35* (2015.01)
*H01Q 9/42* (2006.01)
(Continued)

(52) U.S. Cl.
CPC ................. *H01Q 5/35* (2015.01); *H01Q 1/22* (2013.01); *H01Q 1/2291* (2013.01); *H01Q 1/24* (2013.01);
(Continued)

(58) Field of Classification Search
CPC ........ H01Q 5/35; H01Q 1/2291; H01Q 1/243; H01Q 9/42; H01Q 13/10; H01Q 1/48; H01Q 1/22; H01Q 1/24
(Continued)

(56) References Cited

U.S. PATENT DOCUMENTS

2015/0116169 A1* 4/2015 Ying ...................... H01Q 1/243 343/729
2015/0207228 A1* 7/2015 Oh ......................... H01Q 1/243 343/702
(Continued)

FOREIGN PATENT DOCUMENTS

JP 2005-142739 A 6/2005
JP 2011-23853 A 2/2011
(Continued)

OTHER PUBLICATIONS

International Search Report and Written Opinion dated Jan. 29, 2019, received for PCT Application PCT/ JP2018/045876, Filed on Dec. 13, 2018, 9 pages including English Translation.

*Primary Examiner* — Hai V Tran
(74) *Attorney, Agent, or Firm* — XSENSUS LLP

(57) ABSTRACT

To optimize space efficiency in mounting a plurality of antennas compatible with different frequencies.
According to the present disclosure, provided is an antenna device including a first antenna that operates at a first frequency, and a second antenna that is provided adjacent to the first antenna, operates at a second frequency lower than the first frequency, and has a ground potential connected to a grounding wire provided at the first antenna.

18 Claims, 6 Drawing Sheets

(51) Int. Cl.

| | |
|---|---|
| ***H01Q 13/10*** | (2006.01) |
| ***H01Q 1/22*** | (2006.01) |
| ***H01Q 1/24*** | (2006.01) |
| *H01Q 1/48* | (2006.01) |

(52) U.S. Cl.
CPC ............... *H01Q 1/243* (2013.01); *H01Q 9/42* (2013.01); *H01Q 13/10* (2013.01); *H01Q 1/48* (2013.01)

(58) Field of Classification Search
USPC .......................................................... 343/702
See application file for complete search history.

(56) References Cited

U.S. PATENT DOCUMENTS

| | | | |
|---|---|---|---|
| 2016/0218416 | A1 | 7/2016 | Van Wonterghem |
| 2017/0033443 | A1 | 2/2017 | Tsai |
| 2017/0358847 | A1 | 12/2017 | Cho |

FOREIGN PATENT DOCUMENTS

| | | | |
|---|---|---|---|
| JP | 2012-134950 | A | 7/2012 |
| WO | 2017/135229 | A1 | 8/2017 |

* cited by examiner

ANTENNA DEVICE

CROSS-REFERENCE TO RELATED APPLICATION

The present application is based on PCT filing PCT/JP2018/045876, filed Dec. 13, 2018, the entire contents of which are incorporated herein by reference.

FIELD

The present disclosure relates to an antenna device.

BACKGROUND

For example, In Patent Literature 1 below, a conventional technique is described in which a mobile terminal uses an antenna device having directionality in a certain direction, and the antenna device is configured to be directed in a target direction regardless of the attitude of the mobile terminal.

CITATION LIST

Patent Literature

Patent Literature 1: JP 2012-134950 A

SUMMARY

Technical Problem

It has been assumed that a large amount of data is transmitted at high speed by using a new frequency band of 5G communication system, in addition to a frequency band of mobile terminals having been used in the existing 4G communication system.

Here, mounting of a 5G antenna device on a conventional mobile terminal compatible with a cellular or Wi-Fi system has a possibility of taking up too much space inside the terminal due to the mounting of all of a cellular and Wi-Fi antenna device and the 5G antenna device on the mobile terminal. For this reason, in a case the 5G antenna device is mounted on the mobile terminal compatible with a cellular or Wi-Fi system, there is a problem that the size of the terminal becomes large.

Thus, it has been required to optimize space efficiency in mounting a plurality of antennas compatible with different frequencies.

Solution to Problem

According to the present disclosure, an antenna device includes: a first antenna that operates at a first frequency; and a second antenna that is provided adjacent to the first antenna, operates at a second frequency lower than the first frequency, and has a ground potential connected to a grounding wire provided at the first antenna.

Advantageous Effects of Invention

As described above, according to the present disclosure, it is possible to optimize space efficiency in mounting a plurality of antennas compatible with different frequencies.

Note that the effects described above are not necessarily limitative, and there may be achieved any one of the effects described in this description or other effects that may be grasped from this description, with or in place of the above effects.

DESCRIPTION OF EMBODIMENTS

Figure 1:
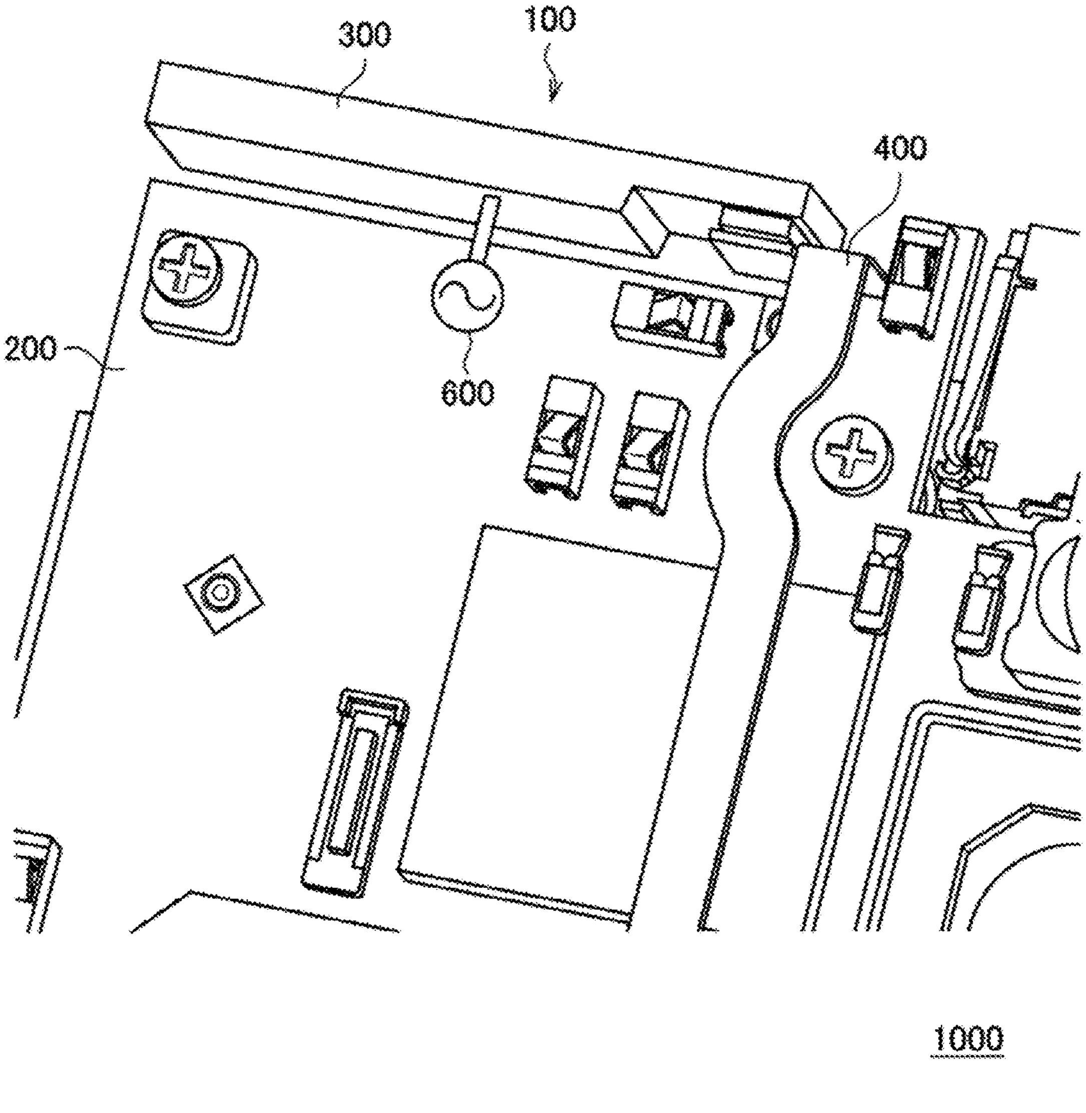
FIG. 1 is a schematic diagram illustrating a schematic configuration of an antenna device and surrounding components according to an embodiment of the present disclosure.

Preferred embodiments of the present disclosure will be described in detail below with reference to the accompanying drawings. Note that in the present specification and the drawings, component elements having substantially the same functional configurations are denoted by the same reference symbols and numerals, and redundant descriptions thereof will be omitted.

Note that description will be given in the following order.

1. Configuration example of antenna device
2. Detailed configuration of antenna device
3. Electrical connection between main board, module board, and metal plate
4. Applications of antenna device

1. Configuration Example of Antenna Device

First, a schematic configuration of an antenna device 100 and surrounding components according to an embodiment of the present disclosure will be described with reference to FIGS. 1 to 3. The present embodiment relates to an antenna device in a case where a 5G millimeter wave communication function is to be added to a mobile terminal 1000 compatible with a cellular or Wi-Fi system. The antenna device 100 is provided in part of the mobile terminal 1000.

The mobile terminal 1000 has a main board 200 on which electronic components are mounted. A module board 300 having a 5G millimeter wave communication function is arranged adjacent to the main board 200. For an example, 5G millimeter wave frequencies are 24.25 to 29.5 [GHz] and 37 to 40 [GHz]. Detailed bands defined by 3GPP, described in TS38 104 V15.3 or the like, are n257: 26.5 to 29.5 [GHz], n258: 24.25 to 27.5 [GHz], n260: 37 to 40 [GHz], and n261: 27.5 to 28.35 [GHz]. As illustrated in FIG. 1, the module board 300 is arranged at an end of the main board 200 so as to be orthogonal to the main board 200.

On the module board 300, a high frequency antenna compatible with 5G millimeter waves and a radio unit thereof are mounted, and the module board 300 communicates signals with the main board 200. Specifically, a millimeter-wave signal is fed to the module board 300 from the main board 200. Therefore, the main board 200 and the module board 300 are wire-connected by a wiring 400. The wiring 400 has a double structure in which wiring on the inside (inner layer) is a signal line of the module board 300 and wiring on the outside (outer layer) is the ground (GND) of the module board 300. The module board 300 emit radiation waves from the antenna, to the opposite side from the main board 200. On the module board 300, a metal plate (sheet metal, not illustrated in FIG. 1) 500 constituting a cellular or Wi-Fi antenna element for lower frequencies relative to those of the 5G millimeter waves is arranged near the main board 200. The metal plate 500 is arranged parallel to the module board 300 and embedded in the module board 300, arranged on a surface of the module board 300, or spaced apart from the module board 300. Preferably, the metal plate 500 is spaced apart from the module board 300. Note that the frequency of a cellular antenna are approximately 800 MHz and the frequency of a Wi-Fi antenna approximately 5 GHz, and the frequencies are one order or more of magnitude lower than the 5G millimeter wave frequencies.

In the present embodiment, power is fed to the module board 300 by using the wired connection portion of the wiring 400 as ground connection for the cellular or Wi-Fi antenna element, and an antenna element for lower frequencies relative to those of the 5G millimeter waves is constituted. In other words, the module board 300 itself, which has the 5G millimeter wave communication function, is operated as an antenna for lower frequencies, and antenna space is prevented from taken up and space efficiency is significantly improved. FIGS. 1 to 3 illustrate the antenna devices 100 having the same basic configuration but different types of antennas. FIG. 1 illustrates an inverted-F antenna, FIG. 2 illustrates a loop antenna, and FIG. 3 illustrates a slot antenna. In this way, use of the module board 300 having the 5G millimeter wave communication function makes it possible to constitute three typical types of antennas. Hereinafter, the respective types of antennas will be described in detail.

2. Detailed Configuration of Antenna Device

Figure 2:
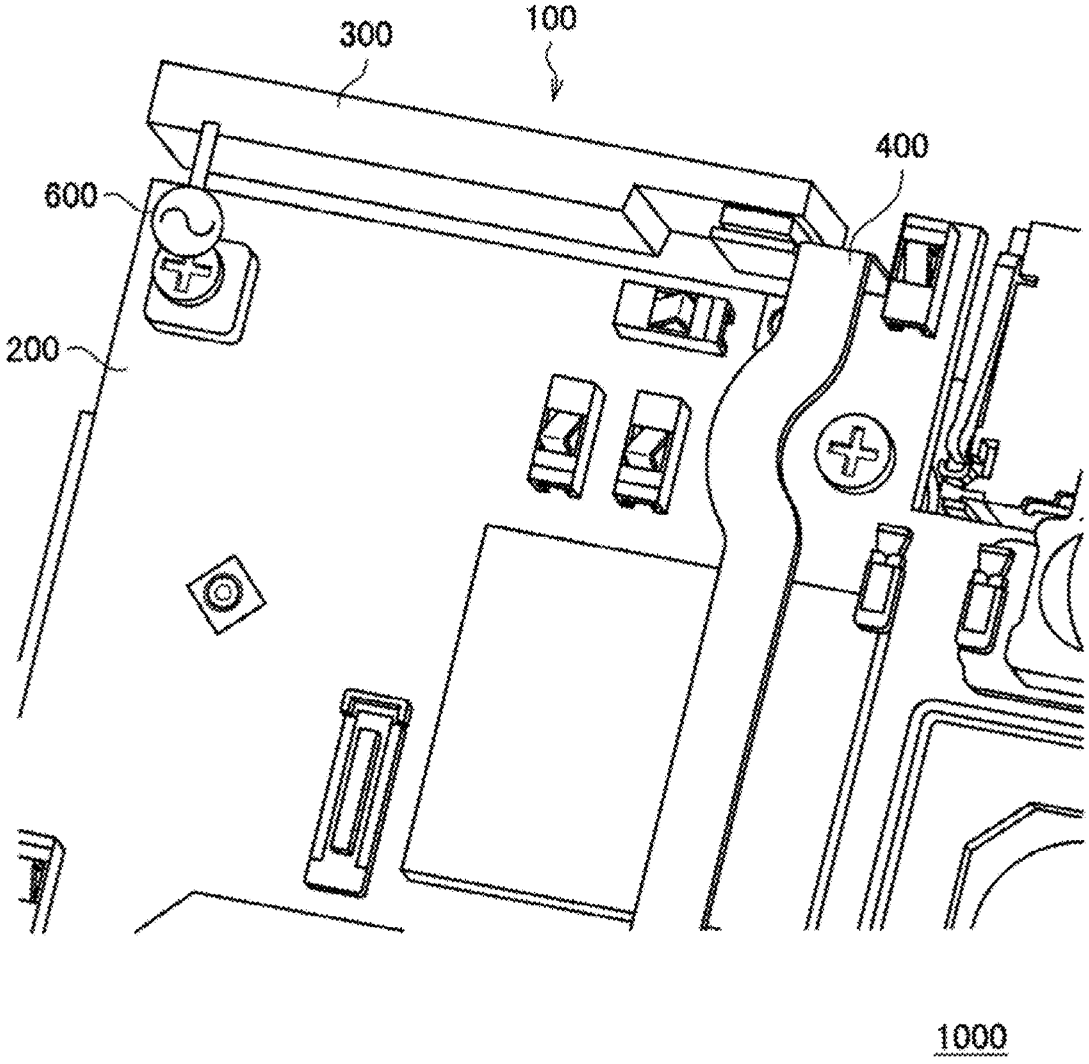
FIG. 2 is a schematic diagram illustrating a schematic configuration of an antenna device and surrounding components according to an embodiment of the present disclosure.
Figure 3:
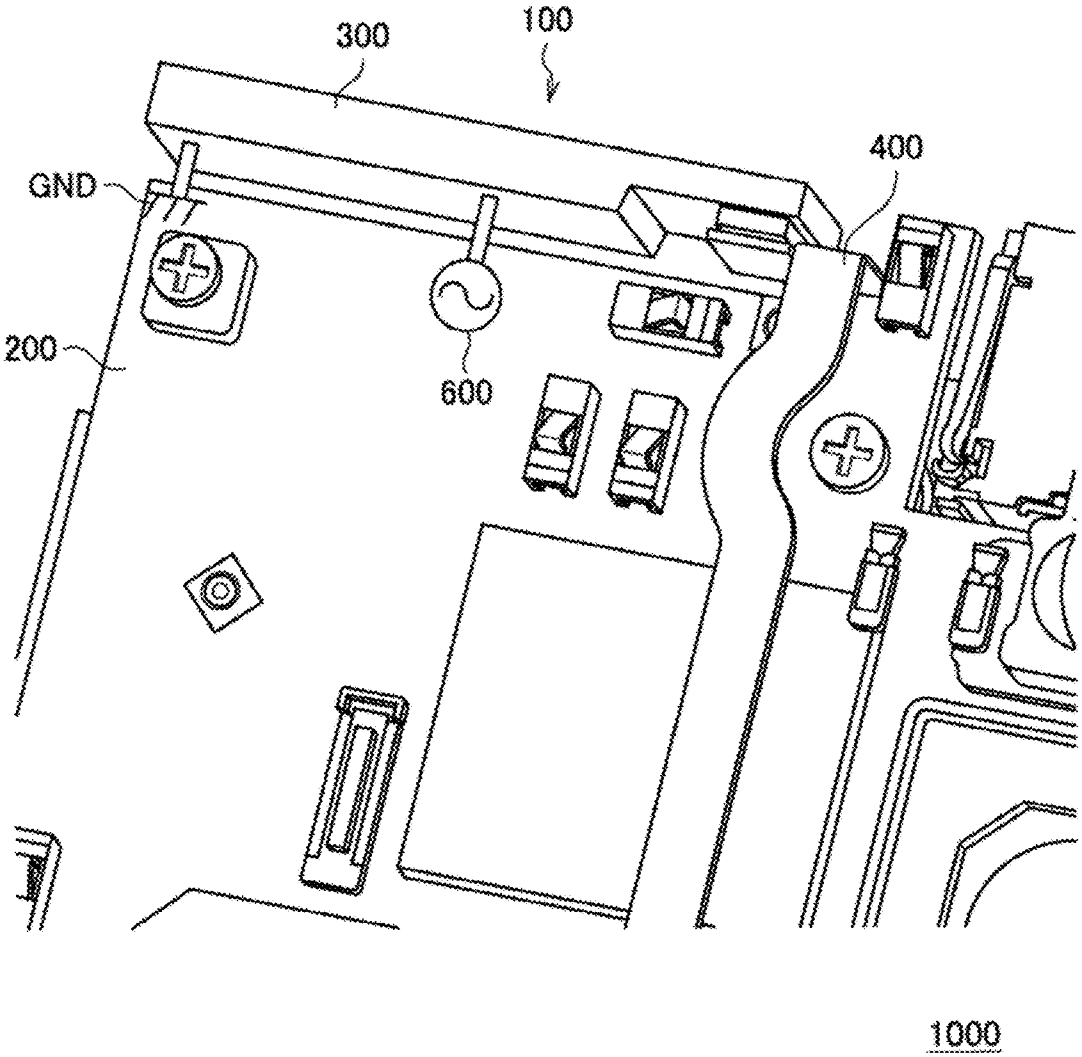
FIG. 3 is a schematic diagram illustrating a schematic configuration of an antenna device and surrounding components according to an embodiment of the present disclosure.
Figure 4A:
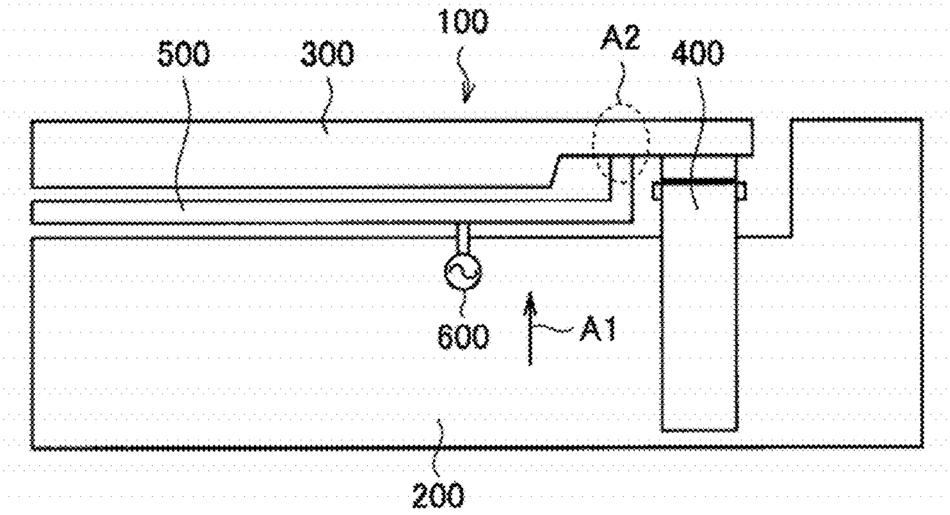
FIG. 4A is a schematic diagram illustrating an antenna device of FIGS. 1 to 3 in detail.
Figure 4B:
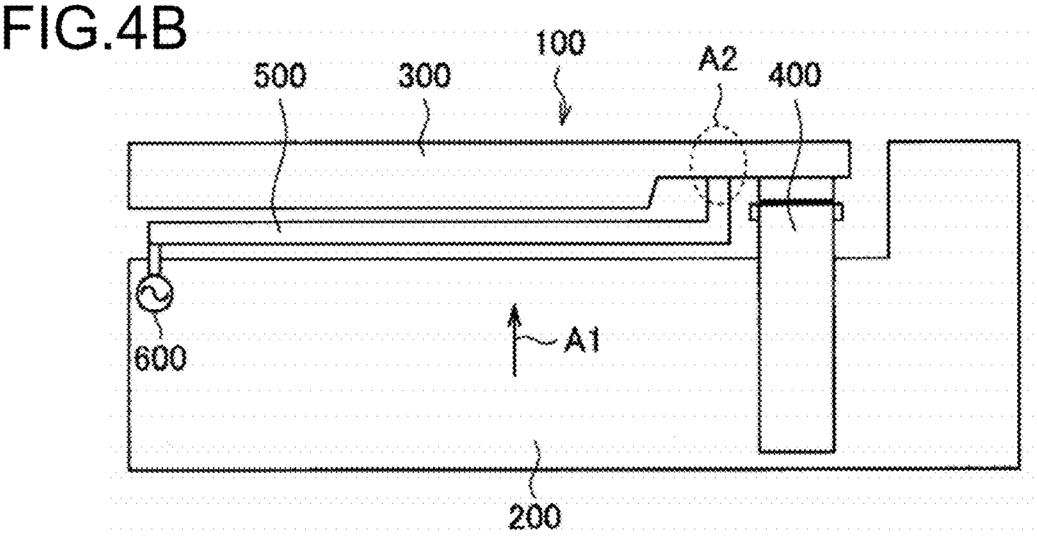
FIG. 4B is a schematic diagram illustrating an antenna device of FIGS. 1 to 3 in detail.
Figure 4C:
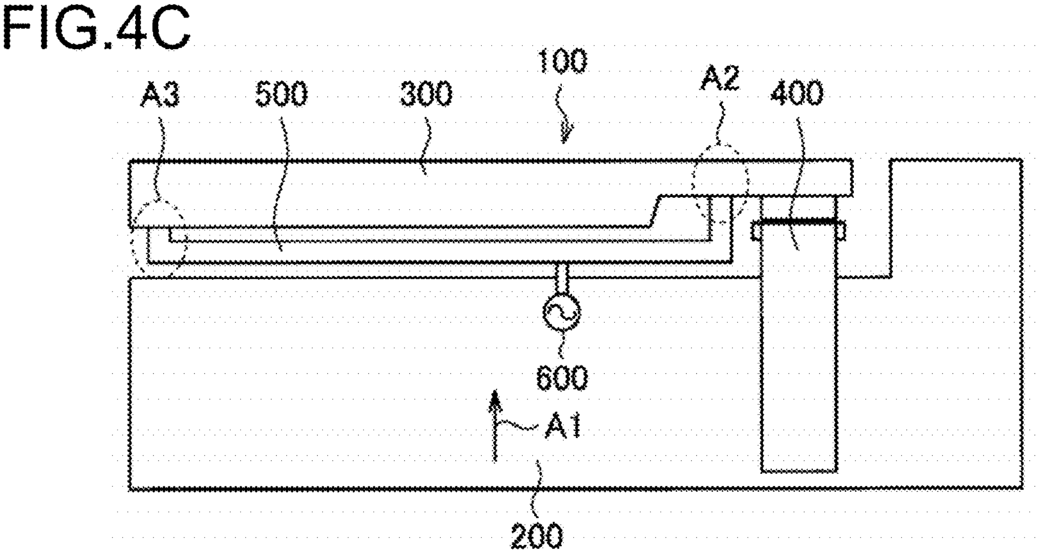
FIG. 4C is a schematic diagram illustrating an antenna device of FIGS. 1 to 3 in detail.

FIGS. 4A, 4B, and 4C are schematic diagrams illustrating the antenna devices 100 of FIGS. 1 to 3 in more detail. FIGS. 4A, 4B, and 4C each illustrate a state in which the module board 300 and surrounding components thereof are viewed in an extending direction of the module board 300.

Figure 5A:
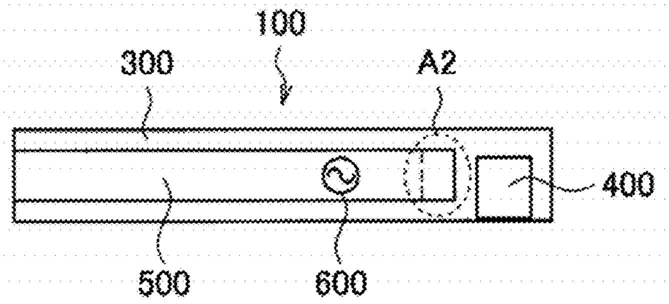
FIG. 5A is a schematic diagram illustrating a state in which a metal plate and a module board are viewed in the direction of the arrow A in FIG. 4A.

Furthermore, FIG. 5A is a schematic diagram illustrating a state in which the metal plate 500 and the module board 300 are viewed in the direction of the arrow A1 in FIG. 4A. Likewise, FIG. 5B is a schematic diagram illustrating a state in which the metal plate 500 and the module board 300 are viewed in the direction of the arrow A1 in FIG. 4B, and FIG. 5C is a schematic diagram illustrating the metal plate 500 and the module board 300 in the direction of the arrow A1 in FIG. 4C.

FIGS. 4A and 5A correspond to the inverted-F antenna of FIG. 1. As illustrated in FIG. 4A, the metal plate 500 constituting the antenna element are spaced apart from the module board 300. The metal plate 500 is conducted to the ground (GND) of the module board 300 in an area A2. A power feeding unit 600 configured to feed power to the metal plate 500 is provided in an area closer to the wiring 400 relative to about the center of the metal plate 500. The power feeding unit 600 feeds power to the metal plate 500 from the main board 200 by a spring contact or the like. In the inverted-F antenna, the power feeding unit 600 is preferably provided in the area closer to the wiring 400 relative to about the center of the metal plate 500, and since there is no other electrical connection other than one ground connection portion, the metal plate 500 has an increased degree of freedom in the shape thereof.

Figure 5B:
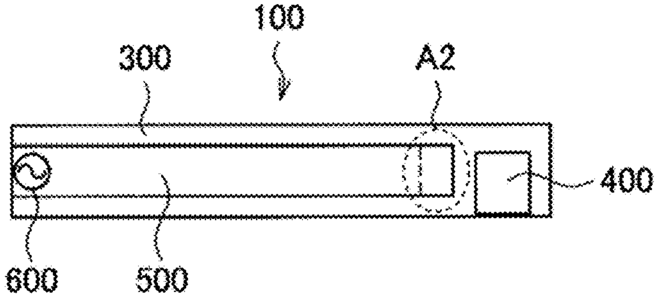
FIG. 5B is a schematic diagram illustrating a state in which a metal plate and a module board are viewed in the direction of the arrow A in FIG. 4B.

FIGS. 4B and 5B correspond to the loop antenna of FIG. 2. The metal plate 500 constituting the antenna element are spaced apart from the module board 300, in the loop antenna as well. The metal plate 500 is conducted to the ground (GND) of the module board 300 in the area A2. The power feeding unit 600 configured to feed power to the metal plate 500 is provided at an end of the metal plate 500 on a side opposite from the ground connection. The power feeding unit 600 feeds power to the metal plate 500 from the main board 200 by a spring contact or the like.

Figure 5C:
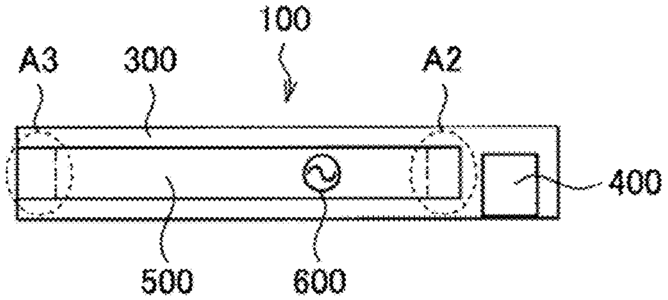
FIG. 5C is a schematic diagram illustrating a state in which a metal plate and a module board are viewed in the direction of the arrow A in FIG. 4C.

FIGS. 4C and 5C correspond to the slot antenna of FIG. 3. The metal plate 500 constituting the antenna element are spaced apart from the module board 300, in the slot antenna as well. The metal plate 500 is conducted to the ground (GND) of the module board 300 in the area A2. The power feeding unit 600 configured to feed power to the metal plate 500 is provided in an area closer to the wiring 400 relative to about the center of the metal plate 500. The power feeding unit 600 feeds power to the metal plate 500 from the main board 200 by a spring contact or the like. Furthermore, in the slot antenna, an end portion of the metal plate 500 is connected in an area A3 to the ground of the module board 300. Note that as described above, in FIGS. 4A to 4C, the metal plate 500 may be embedded in the module board 300. Furthermore, FIGS. 5A to 5C each illustrates a rectangular shape as the planar shape of the metal plate 500, but the planar shape of the metal plate 500 can have any shape such as a square shape.

3. Electrical Connection Between Main Board, Module Board, and Metal Plate

Figure 6A:
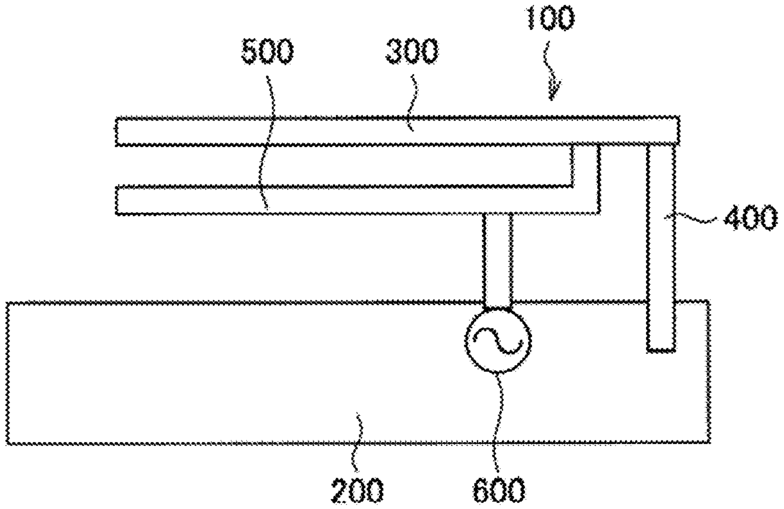
FIG. 6A is a diagram schematically illustrating an electrical connection between a main board and a module board.
Figure 6B:
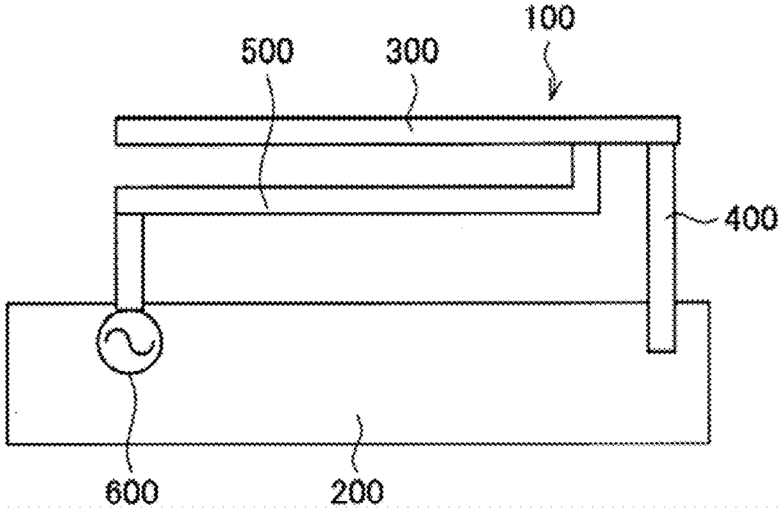
FIG. 6B is a diagram schematically illustrating an electrical connection between a main board and a module board.
Figure 6C:
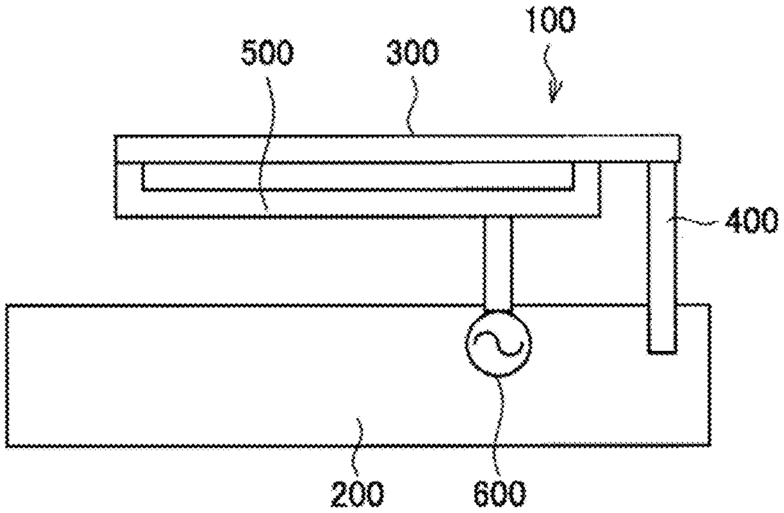
FIG. 6C is a diagram schematically illustrating an electrical connection between a main board and a module board.

FIGS. 6A, 6B, and 6C are diagrams each schematically illustrating the electrical connection between the main board 200, the module board 300, and the metal plate 500. FIG. 6A corresponds to the inverted-F antenna of FIG. 1, FIG. 6B corresponds to the loop antenna of FIG. 2, and FIG. 6C corresponds to the slot antenna of FIG. 3.

In the inverted-F antenna illustrated in FIG. 6A, the power feeding unit 600 is connected near the center of the metal plate 500. Furthermore, in the loop antenna illustrated in FIG. 6B, the power feeding unit 600 is connected to the end portion of the metal plate 500. Furthermore, in the slot antenna illustrated in FIG. 6C, the power feeding unit 600 is arranged closer to the broken line 400 relative to the center. Furthermore, in the slot antenna illustrated in FIG. 6C, the ground connection is made on a side opposite from a side to which the wiring 400 is connected. In this way, a signal having a frequency different from that of the module board 300 is fed to the metal plate 500 provided in parallel with the module board 300, thereby constituting the cellular or Wi-Fi antenna. Note that the antenna element may include a board pattern, instead of the metal plate 500.

4. Applications of Antenna Device

The antenna device according to the present disclosure is applicable to various fields such as IoT or in-vehicle devices in addition to mobile terminals as described above.

Preferred embodiments of the present disclosure have been described above in detail with reference to the accompanying drawings, but the technical scope of the present disclosure is not limited to these examples. It is apparent that those skilled in the art may arrive at various alternations and modifications within the scope of claims, and those examples are understood as naturally falling within the technical scope of the present disclosure.

Furthermore, the effects descried herein are merely explanatory or exemplary effects, and not limitative. In other words, the technology according to the present disclosure can achieve other effects that are apparent to those skilled in the art from the description herein, along with or instead of the above effects.

Additionally, the following configurations also belong to the technical scope of the present disclosure.

(1)

An antenna device comprising:

a first antenna that operates at a first frequency; and a second antenna that is provided adjacent to the first antenna, operates at a second frequency lower than the first frequency, and has a ground potential connected to a grounding wire provided at the first antenna.

(2)

The antenna device according to (1), further comprising:

a main board that is electrically connected to both of the first antenna and the second antenna; and a power feeding unit configured to feed power from the main board to the second antenna.

(3)

The antenna device according to (2), wherein a module board that constitutes the first antenna is arranged at an end of the main board so as to be orthogonal to the main board, and a metal plate that constitutes the second antenna is arranged in parallel with and apart from the metal plate.

(4)

The antenna device according to (2), wherein a module board that constitutes the first antenna is arranged at an end of the main board so as to be orthogonal to the main board, and a conductor that constitutes the second antenna is provided on the module board, near the main board.

(5)

The antenna device according to (2), wherein the second antenna includes a metal plate and has a first end portion as a ground potential and a second end portion on a side opposite from the first end portion, and the power feeding unit is provided between the first end portion and the second end portion.

(6)

The antenna device according to (2), wherein the second antenna includes a metal plate and has a first end portion as a ground potential and a second end portion on a side opposite from the first end portion, and the power feeding unit is provided at the second end portion.

(7)

The antenna device according to (2), wherein the second antenna includes a metal plate and has a first end portion as a ground potential and a second end portion as a ground potential on a side opposite from the first end portion, and the power feeding unit is provided between the first end portion and the second end portion.

(8)

The antenna device according to any one of (1) to (6), wherein the first frequency has a 5G millimeter wave frequency, and the second frequency has a frequency of 20 GHz or less.

(9)

The antenna device according to any one of (1) to (7), wherein the antenna device is mounted on a mobile terminal.

(10)

The antenna device according to any one of (1) to (7), wherein the antenna device is mounted on an IoT terminal or an in-vehicle terminal.

REFERENCE SIGNS LIST

100 ANTENNA DEVICE
200 MAIN BOARD
300 MODULE BOARD
500 METAL PLATE
600 POWER FEEDING UNIT

The invention claimed is:

1. An antenna device comprising:

a first antenna that operates at a first frequency;

a second antenna that is provided adjacent to the first antenna, operates at a second frequency lower than the first frequency, and has a ground potential connected to a grounding wire provided at the first antenna;

a main board that is electrically connected to both of the first antenna and the second antenna; and a power feed configured to feed power from the main board to the second antenna, wherein the second antenna includes a metal plate and has a first end portion as a ground potential and a second end portion on a side opposite from the first end portion, and the power feed is provided between the first end portion and the second end portion.

2. The antenna device according to claim 1, wherein a module board that constitutes the first antenna is arranged at an end of the main board so as to be orthogonal to the main board, and a metal plate that constitutes the second antenna is arranged in parallel with and apart from the module board, near the main board.

3. The antenna device according to claim 1, wherein a module board that constitutes the first antenna is arranged at an end of the main board so as to be orthogonal to the main board, and a conductor that constitutes the second antenna is provided on the module board, near the main board.

4. The antenna device according to claim 1, wherein the first frequency has a 5G millimeter wave frequency, and the second frequency has a frequency of 20 GHz or less.

5. The antenna device according to claim 1, wherein the antenna device is mounted on a mobile terminal.

6. The antenna device according to claim 1, wherein the antenna device is mounted on an IoT terminal or an in-vehicle terminal.

7. An antenna device comprising:

a first antenna that operates at a first frequency;

a second antenna that is provided adjacent to the first antenna, operates at a second frequency lower than the first frequency, and has a ground potential connected to a grounding wire provided at the first antenna;

a main board that is electrically connected to both of the first antenna and the second antenna; and a power feed configured to feed power from the main board to the second antenna, wherein the second antenna includes a metal plate and has a first end portion as a ground potential and a second end portion on a side opposite from the first end portion, and the power feed is provided at the second end portion.

8. The antenna device according to claim 7, wherein the first frequency has a 5G millimeter wave frequency, and the second frequency has a frequency of 20 GHz or less.

9. The antenna device according to claim 7, wherein the antenna device is mounted on a mobile terminal.

10. The antenna device according to claim 7, wherein the antenna device is mounted on an IoT terminal or an in-vehicle terminal.

11. The antenna device according to claim 7, wherein a module board that constitutes the first antenna is arranged at an end of the main board so as to be orthogonal to the main board, and a metal plate that constitutes the second antenna is arranged in parallel with and apart from the module board, near the main board.

12. The antenna device according to claim 7, wherein a module board that constitutes the first antenna is arranged at an end of the main board so as to be orthogonal to the main board, and a conductor that constitutes the second antenna is provided on the module board, near the main board.

13. An antenna device comprising:

a first antenna that operates at a first frequency;

a second antenna that is provided adjacent to the first antenna, operates at a second frequency lower than the first frequency, and has a ground potential connected to a grounding wire provided at the first antenna;

a main board that is electrically connected to both of the first antenna and the second antenna; and a power feed configured to feed power from the main board to the second antenna, wherein the second antenna includes a metal plate and has a first end portion as a ground potential and a second end portion as a ground potential on a side opposite from the first end portion, and the power feed is provided between the first end portion and the second end portion.

14. The antenna device according to claim 13, wherein a module board that constitutes the first antenna is arranged at an end of the main board so as to be orthogonal to the main board, and a metal plate that constitutes the second antenna is arranged in parallel with and apart from the module board, near the main board.

15. The antenna device according to claim 13, wherein a module board that constitutes the first antenna is arranged at an end of the main board so as to be orthogonal to the main board, and a conductor that constitutes the second antenna is provided on the module board, near the main board.

16. The antenna device according to claim 13, wherein the first frequency has a 5G millimeter wave frequency, and the second frequency has a frequency of 20 GHz or less.

17. The antenna device according to claim 13, wherein the antenna device is mounted on a mobile terminal.

18. The antenna device according to claim 13, wherein the antenna device is mounted on an IoT terminal or an in-vehicle terminal.

* * * * *